United States Patent
Shin et al.

(10) Patent No.: US 11,967,732 B2
(45) Date of Patent: Apr. 23, 2024

(54) SEPARATION MEMBRANE FOR LITHIUM SECONDARY BATTERY AND LITHIUM SECONDARY BATTERY INCLUDING SAME

(71) Applicant: LG CHEM, LTD., Seoul (KR)

(72) Inventors: Won Kyung Shin, Daejeon (KR); Kyoung Ho Ahn, Daejeon (KR); Chul Haeng Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 815 days.

(21) Appl. No.: 17/044,370

(22) PCT Filed: Apr. 29, 2019

(86) PCT No.: PCT/KR2019/005146
§ 371 (c)(1),
(2) Date: Oct. 1, 2020

(87) PCT Pub. No.: WO2019/209087
PCT Pub. Date: Oct. 31, 2019

(65) Prior Publication Data
US 2021/0104802 A1    Apr. 8, 2021

(30) Foreign Application Priority Data
Apr. 27, 2018  (KR) .................. 10-2018-0049375

(51) Int. Cl.
*H01M 50/446*  (2021.01)
*H01M 4/62*  (2006.01)
(Continued)

(52) U.S. Cl.
CPC ......... *H01M 50/446* (2021.01); *H01M 4/622* (2013.01); *H01M 10/0525* (2013.01); *H01M 10/0565* (2013.01)

(58) Field of Classification Search
None
See application file for complete search history.

(56) References Cited

U.S. PATENT DOCUMENTS

| 11,658,301 B2* | 5/2023 | Shin ................. H01M 10/0525 |
| | | 429/303 |
| 2001/0023041 A1 | 9/2001 | Hayase et al. |

(Continued)

FOREIGN PATENT DOCUMENTS

| CN | 102334215 A | 1/2012 |
| CN | 103247819 A | 8/2013 |

(Continued)

OTHER PUBLICATIONS

Extended European Search Report issued by the European Patent Office dated Mar. 30, 2021 in a corresponding European Patent Application No. 19793474.8.

(Continued)

*Primary Examiner* — Alix E Eggerding
(74) *Attorney, Agent, or Firm* — Morgan, Lewis & Bockius LLP

(57) ABSTRACT

The present invention provides a separation membrane for a lithium secondary battery and a lithium secondary battery including the same, the separation membrane including: a substrate; a first coating layer containing a first organic binder which is able to be bonded to a gel polymer electrolyte through an epoxy ring-opening reaction; and a second coating layer containing a second organic binder, wherein the first organic binder has a functional group capable of ring-opening reaction with an epoxy group, or a combination thereof, and the gel polymer electrolyte is formed by polymerizing an oligomer having an epoxy group, a functional group capable of ring-opening reaction with an epoxy group, or a combination thereof.

10 Claims, 1 Drawing Sheet

(51) Int. Cl.
*H01M 10/0525* (2010.01)
*H01M 10/0565* (2010.01)

(56) References Cited

U.S. PATENT DOCUMENTS

| | | | |
|---|---|---|---|
| 2003/0228521 A1 | 12/2003 | Hayase et al. | |
| 2011/0318630 A1 | 12/2011 | Wakizaka et al. | |
| 2013/0202944 A1 | 8/2013 | Song et al. | |
| 2013/0244080 A1 | 9/2013 | Song et al. | |
| 2013/0244082 A1* | 9/2013 | Lee | H01M 50/451 |
| | | | 429/144 |
| 2013/0280584 A1 | 10/2013 | Matsumura | |
| 2014/0050965 A1 | 2/2014 | Ha et al. | |
| 2014/0308564 A1 | 10/2014 | Kim et al. | |
| 2015/0349312 A1 | 12/2015 | Ha et al. | |
| 2017/0229735 A1 | 8/2017 | Ahn et al. | |
| 2017/0309956 A1 | 10/2017 | Park et al. | |

FOREIGN PATENT DOCUMENTS

| | | |
|---|---|---|
| CN | 103477491 A | 12/2013 |
| CN | 106797053 A | 5/2017 |
| CN | 107078342 A | 8/2017 |
| CN | 107710469 A | 2/2018 |
| EP | 3709424 A1 | 9/2020 |
| JP | 2002-075331 A | 3/2002 |
| JP | 2014-505344 A | 2/2014 |
| JP | 2016-072117 A | 5/2016 |
| KR | 10-2006-0042326 A | 5/2006 |
| KR | 10-2013-0073182 A | 7/2013 |
| KR | 10-2013-0090724 A | 8/2013 |
| KR | 10-2013-0092245 A | 8/2013 |
| KR | 10-2013-0105334 A | 9/2013 |
| KR | 10-2013-0123744 A | 11/2013 |
| KR | 10-1346414 B1 | 1/2014 |
| KR | 10-2014-0123140 A | 10/2014 |
| KR | 10-2015-0131513 A | 11/2015 |
| KR | 10-1637477 B1 | 7/2016 |
| WO | 2010/074202 A1 | 7/2010 |
| WO | 2012/043729 A1 | 4/2012 |
| WO | 2012/073996 A1 | 6/2012 |

OTHER PUBLICATIONS

International Search Report (with partial translation) and Written Opinion issued in corresponding International Patent Application No. PCT/KR2019/005146, dated Aug. 9, 2019.
Office Action issued in corresponding Chinese Patent Application No. 201980024446.9 dated Jun. 7, 2023.

* cited by examiner

SEPARATION MEMBRANE FOR LITHIUM SECONDARY BATTERY AND LITHIUM SECONDARY BATTERY INCLUDING SAME

CROSS-REFERENCE TO RELATED APPLICATION

This application claims the benefit of Korean Patent Application No. 10-2018-0049375, filed on Apr. 27, 2018, in the Korean Intellectual Property Office, the disclosure of which is incorporated herein in its entirety by reference.

TECHNICAL FIELD

The present invention relates to a separation membrane for a lithium secondary battery and a lithium secondary battery including the same, and more particularly to a separation membrane for a lithium secondary battery and a lithium secondary battery including the same, the separation membrane containing a gel polymer electrolyte.

BACKGROUND ART

Demand for secondary batteries as an energy source has been significantly increased as technology development and demand for mobile devices have increased, and among these secondary batteries, a lithium secondary battery having high energy density, high operating potential, long cycle life, and low self-discharging rate has been commercialized and widely used.

Furthermore, as concerns about environmental issues grow recently, many studies for electric vehicles (EVs) and hybrid electric vehicles (HEVs), which may replace vehicles using fossil fuels, such as gasoline vehicles and diesel vehicles, which are one of major causes of air pollution, are conducting.

A nickel-metal hydride (Ni-MH) secondary battery or lithium secondary battery having high energy density, high discharge voltage, and output stability has been used as a power source in such electric vehicles (EVs) and hybrid electric vehicles (HEVs), and when the lithium secondary battery is used in the electric vehicles, the lithium secondary battery should be used for more than 10 years under severe conditions in addition to having characteristics of high energy density and ability to provide high output in a short period of time, and accordingly, it is inevitably required to have remarkably more excellent energy density, safety, and long life characteristics than the conventional small-sized lithium secondary battery.

Generally, a lithium secondary battery is manufactured by using a negative electrode (anode), a positive electrode (cathode), a separation membrane disposed therebetween, and an electrolyte which is a transfer medium of lithium ions, and in the conventional secondary battery, an electrolyte in a liquid state, particularly an ionic conductive organic liquid electrolyte in which a salt is dissolved in a non-aqueous organic solvent, has been mainly used.

However, when such an electrolyte in a liquid state is used, there are high possibilities of degrading electrode materials and volatizing an organic solvent, and also there is a problem in safety such as combustion caused by increasing ambient temperature and temperature of a battery itself. In particular, a lithium secondary battery has a problem in that, since gas is generated inside the battery due to decomposition of a carbonate organic solvent and/or a side reaction between organic solvent and electrode during charging and discharging, a thickness of the battery increases. Accordingly, deterioration of performance and safety of the battery is essentially caused.

Generally, it is known that battery safety improves in the order of a liquid electrolyte, a gel polymer electrolyte, and a solid polymer electrolyte, but contrariwise, battery performance decreases in the same order. Currently, it is known that the solid polymer electrolyte has not been commercialized yet due to poor battery performance.

On the other hand, since the gel polymer electrolyte has an excellent electrochemical safety, a constant thickness of a battery may be maintained, and also, since the gel polymer electrolyte has excellent adhesion between the electrode and the electrolyte due to the adhesive force inherent in the gel, a thin film battery may be manufactured, and accordingly recently, a gel polymer electrolyte has been widely used.

On the other hand, the separation membrane is an inert material which does not participate in an electrochemical reaction, but a material which provides a path through which lithium ions move to operate a battery and separates physical contact between positive electrode and negative electrode, and accordingly, the separation membrane is one of the key materials which greatly affect performance and stability of a battery.

In a lithium secondary battery, heat may be easily generated due to a kinetic energy generated during repeated charge and discharge, and a separation membrane is vulnerable to such heat. Particularly in a separation membrane using polyethylene (PE), a 'shut down' phenomenon may occur in which melting starts at about 130° C. to close pores, and since the separation membrane melts completely above 150° C., it may not prevent an internal shut-down and meltdown or mechanical integrity failure may occur.

To overcome such problems, studies for enhancing durability, for example, performing a dip-coating method in which a surface of a separation membrane is coated with inorganic particles and polymer binder, have recently been continued.

However, when the gel polymer electrolyte and a separation membrane on which a coating layer containing inorganic particles is formed, are used together, an element capable of providing adhesive force between the coating layer and the electrolyte is absent. Accordingly, the electrolyte may not be uniformly formed on the separation membrane, thereby increasing interfacial resistance and resulting in a short-circuit inside a battery.

Accordingly, it is desired to develop a separation membrane which has excellent processability to be applied to various batteries and improves adhesion between gel polymer electrolytes while maintaining durability above a certain level, thereby improving safety and life-time characteristics of a battery, and a lithium secondary battery including the same.

(Patent Document 1) KR 10-2015-0131513 A

DISCLOSURE OF THE INVENTION

Technical Problem

An aspect of the present invention provides a separation membrane for a lithium secondary battery and a lithium secondary battery including the same, the separation membrane being capable of improving safety and life-time characteristics of a battery by increasing adhesion with a gel polymer electrolyte and also improving processability by having a multi-layer structure.

Technical Solution

According to an aspect of the present invention, there is provided a separation membrane for a lithium secondary battery, the separation membrane including: a substrate; a first coating layer containing a first organic binder which is able to be bonded to a gel polymer electrolyte through an epoxy ring-opening reaction; and a second coating layer containing a second organic binder, wherein the first organic binder has a functional group capable of ring-opening reaction with an epoxy group, or a combination thereof, and the gel polymer electrolyte is formed by polymerizing an oligomer having an epoxy group, a functional group capable of ring-opening reaction with an epoxy group, or a combination thereof.

At this time, the functional group capable of ring-opening reaction with an epoxy group is at least one functional group selected from the group consisting of a hydroxyl group (OH), a carboxylic acid group (COOH), an amine group, an isocyanate group, a mercaptan group, and an imide group.

On the other hand, the first organic binder may include a unit containing at least one selected from the group consisting of an alkylene group which is substituted with at least one halogen element and which has 1 to 5 carbon atoms, an alkylene oxide group having 1 to 5 carbon atoms, an alkylene oxide group which is substituted with at least one halogen and which has 1 to 5 carbon atoms, an imide group, and cellulose, wherein an epoxy group, a functional group capable of ring-opening reaction with an epoxy group, or a combination thereof may be substituted in a main chain which is formed of the unit.

On the other hand, the oligomer may include at least one unit selected from the group consisting of a unit containing an alkylene oxide group and a unit containing an amine group, wherein an epoxy group, a functional group capable of ring-opening reaction with an epoxy group, or a combination thereof may be substituted in a main chain which is formed of the unit.

In an embodiment of the present invention, at least one coating layer, which is selected from the first coating layer and the second coating layer, may include an inorganic oxide containing at least one element selected from the group consisting of Si, Al, Ti, Zr, Sn, Ce, Mg, Ca, Zn, Y, Pb, Ba, Hf, and Sr.

In another embodiment of the present invention, the first coating layer may be formed on the substrate and the second coating layer may be formed on the first coating layer, and alternatively in another embodiment, the second coating layer may be formed on the substrate and the first coating layer may be formed on the second coating layer.

According to an embodiment of the present invention, there is provided a lithium secondary battery including: an electrode assembly including at least one unit cell which contains at least one positive electrode, at least one negative electrode, and at least one first separation membrane disposed between the positive electrode and negative electrode; and a gel polymer electrolyte formed by polymerizing an oligomer having an epoxy group, a functional group capable of ring-opening reaction with an epoxy group, or a combination thereof, wherein the first separation membrane is the described separation membrane for a lithium secondary battery.

Advantageous Effects

According to the present invention, a separation membrane for a lithium secondary battery includes a first coating layer containing a first organic binder which can be bonded to a gel polymer electrolyte through an epoxy ring-opening reaction, thereby improving bonding force with the gel polymer electrolyte, and accordingly, safety may be improved by preventing short-circuit inside a battery and life-time characteristics of a lithium secondary battery may be improve.

BEST MODE FOR CARRYING OUT THE INVENTION

Figure 1:
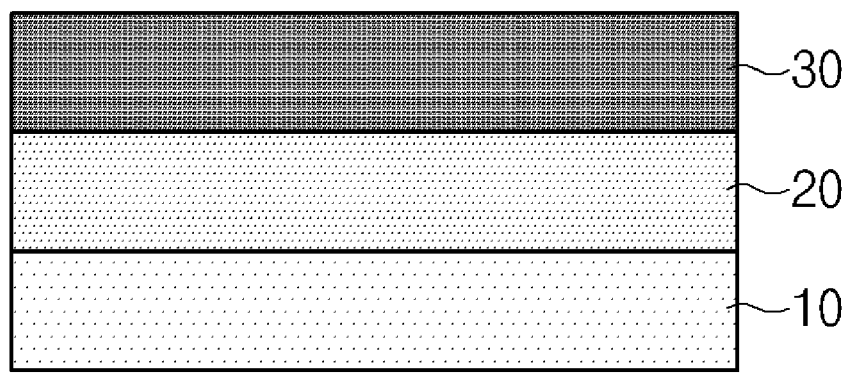
FIG. 1 is a cross-sectional view of a separation membrane according to Examples 1 and 2 of the present invention.
Figure 2:
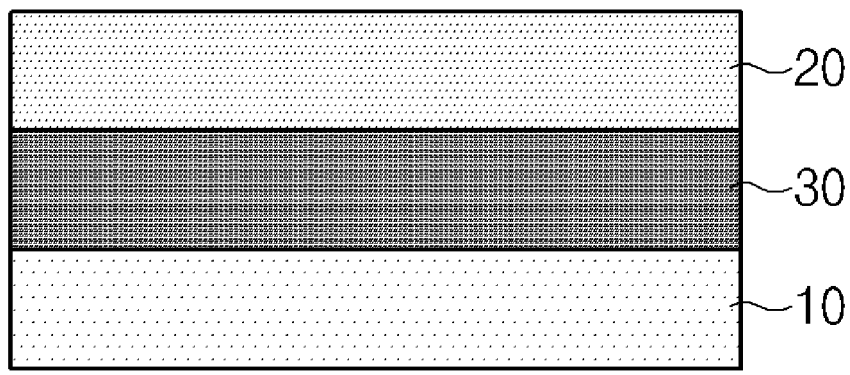
FIG. 2 is a cross-sectional view of a separation membrane according to Examples 3 and 4 of the present invention.

Hereinafter, the present invention will be described in detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Unless otherwise specified in the present invention, the expression "*" denotes the same or different atom or a portion connected between ends of a formula.

In the present invention, the weight average molecular weight (Mw) may be measured by using gel permeation chromatography (GPC). For example, a sample of a certain concentration is prepared, and thereafter a GPC measurement system alliance 4 instrument is stabilized. Once the instrument is stabilized, the standard sample and sample are injected to the instrument to obtain a chromatogram, and the molecular weight may be calculated according to the analysis methods (System: Alliance 4, Column: Ultrahydrogel linear×2, Eluent: 0.1M $NaNO_3$ (pH 7.0 phosphate buffer), Flow rate: 0.1 mL/min, Temp.: 40° C., Injection: 100 mL).

Separation Membrane for Lithium Secondary Battery

The separation membrane for a lithium secondary battery according to the present invention includes (1) a substrate, (2) a first coating layer containing a first organic binder which can be bonded to a gel polymer electrolyte through an epoxy ring-opening reaction, and (3) a second coating layer containing a second organic binder, wherein the first organic binder has a functional group capable of ring-opening reaction with an epoxy group, or a combination thereof, and the gel polymer electrolyte is formed by polymerizing an oligomer having an epoxy group, a functional group capable of ring-opening reaction with an epoxy group, or a combination thereof.

The substrate may use a porous substrate, and the porous substrate may be used without any particular limitations as long as conventionally used as a separation membrane material for an electrochemical device. Examples of such a porous substrate may be a nonwoven fabric or porous polymer film formed of at least one of polyolefin, polyethylene terephthalate, polybutylene terephthalate, polyacetal, polyamide, polycarbonate, polyimide, polyetherether ketone, polyether sulfone, polyphenylene oxide, polyphenylene sulfide, or polyethylene naphthalene, or may be a laminate of two or more thereof, but the embodiment is not limited thereto.

The first coating layer includes a first organic binder which can be bonded to a gel polymer electrolyte through an epoxy ring-opening reaction. In addition, the first coating layer may selectively further include an inorganic oxide.

The first organic binder includes a functional group capable of ring-opening reaction with an epoxy group, or a combination thereof, and the gel polymer electrolyte is formed by polymerizing an oligomer including an epoxy group, a functional group capable of ring-opening reaction with an epoxy group, or a combination thereof. At this time, the first coating layer may selectively further include an inorganic oxide.

Specifically, the functional group capable of ring-opening reaction with an epoxy group may be at least one functional group selected from the group consisting of a hydroxyl group (OH), a carboxylic acid group (COOH), an amine group, an isocyanate group, a mercaptan group, and an imide group.

More specifically, the amine group may be represented by $-NR_1R_2$, wherein $R_1$ and $R_2$ may each independently be selected from the group consisting of hydrogen (H), a substituted or unsubstituted chain alkyl group having 1 to 10 carbon atoms, and a substituted or unsubstituted cyclic alkyl group having 1 to 10 carbon atoms.

More specifically, the imide group may be represented by $-R_3-CO-N(R_4)-CO-R_5$, wherein $R_3$ to $R_5$ may each independently be selected from the group consisting of hydrogen (H), a substituted or unsubstituted chain alkyl group having 1 to 10 carbon atoms, and a substituted or unsubstituted cyclic alkyl group having 1 to 10 carbon atoms.

Meanwhile, the first organic binder may use conventional organic binders well known in the art such as poly(vinylidene fluoride) (PVdF) and PVdF-co-HFP (copolymer of poly(vinylidene fluoride) and hexafluoropropylene) in which an epoxy group and/or a functional group capable of ring-opening reaction with an epoxy group are/is substituted. More specifically, the first organic binder may further include, in addition to the functional group, a unit containing at least one selected from the group consisting of an alkylene group which is substituted with at least one halogen element (F, Cl, Br, and I) and which has 1 to 5 carbon atoms, an alkylene oxide group having 1 to 5 carbon atoms, an imide group, and cellulose.

At this time, an epoxy group, a functional group capable of ring-opening reaction with an epoxy group, or a combination thereof may be substituted in a main chain which is formed of the unit. Specifically, hydrogen (H) in the main chain may be substituted with an epoxy group, a functional group capable of ring-opening reaction with an epoxy group, or a combination thereof, and a degree of substitution may be calculated in a unit of mol %. However, the number or position of the substituted functional groups is not specified.

For example, the unit containing an alkylene group which is substituted with at least one halogen element may be represented by at least one selected from the units represented by Formulae X-1 and X-2 below:

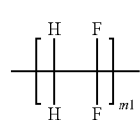

[Formula X-1]

In Formula X-1, m1 is an integer of 1 to 10,000, preferably 1 to 7,500, and more preferably 1 to 5,000; and

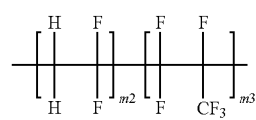

[Formula X-2]

*54

In Formula X-2, m2 and m3 are each independently an integer of 1 to 10,000, preferably 1 to 7,500, and more preferably 1 to 5,000.

For example, the unit containing an alkylene oxide group may be represented by Formula X-3 below:

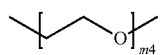

[Formula X-3]

In Formula X-3, m4 is an integer of 1 to 10,000, preferably 1 to 7,500, and more preferably 1 to 5,000.

For example, the unit containing an alkylene oxide group which is substituted with a halogen element may be represented by Formula X-4 below:

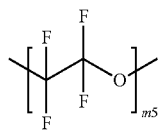

[Formula X-4]

In Formula X-4, m5 is an integer of 1 to 10,000, preferably 1 to 7,500, and more preferably 1 to 5,000.

For example, the unit containing an imide group may be represented by Formula X-5 below:

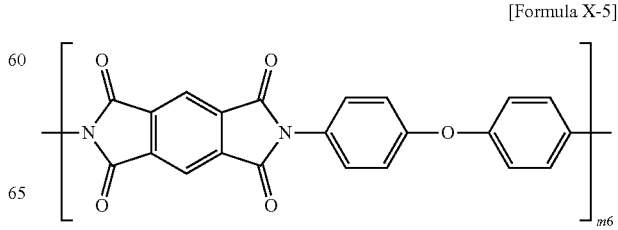

[Formula X-5]

In Formula X-5, m6 is an integer of 1 to 10,000, preferably 1 to 7,500, and more preferably 1 to 5,000.

For example, the unit containing cellulose may be represented by Formula X-6 below:

[Formula X-6]

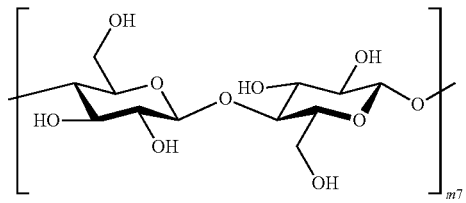

In Formula X-6, m7 is an integer of 1 to 10,000, preferably 1 to 7,500, and more preferably 1 to 5,000.

Meanwhile, the first organic binder may be included in an amount of 100 wt % with respect to the total weight of the first coating layer to form a coating layer alone, and when an inorganic oxide is further contained, the first organic binder may be included in an amount of 10-80 wt % with respect to the total weight of the first coating layer, specifically 10-60 wt %, and more specifically 10-50 wt %.

The inorganic oxide is a compound having excellent heat resistance and durability, and when coated on the separation membrane, the mechanical strength of the separation membrane may be improved and the heat resistance may also be improved.

Specifically, for example, the inorganic oxide may contain at least one element selected from the group consisting of Si, Al, Ti, Zr, Sn, Ce, Mg, Ca, Zn, Y, Pb, Ba, Hf, and Sr, and preferably at least one element selected from the group consisting of Si, Al, Ti, and Zr.

More specifically, the inorganic oxide is $SiO_2$, $Al_2O_3$, $TiO_2$, $ZrO_2$, $SnO_2$, $CeO_2$, MgO, CaO, ZnO, $Y_2O_3$, $Pb(Zr,Ti)O_3$ (PZT), $Pb_{(1-a1)}La_{a1}Zr_{(1-b1)}Ti_{b1}O_3$ (PLZT, $0 \leq a1 \leq 1$ and $0 \leq b1 \leq 1$), $Pb(Mg_{1/3}Nb_{2/3})O_3$—$PbTiO_3$ (PMN-PT), $BaTiO_3$, $HfO_2$ (hafnia), $SrTiO_3$, etc., and the described inorganic oxides have generally characteristics such that physical properties do not change even when temperature thereof is higher than 200° C. More preferably, the inorganic oxide may include at least one selected from the group consisting of $SiO_2$, $Al_2O_3$, $TiO_2$, and $ZrO_2$.

The inorganic oxide may be included in an amount of 20-90 wt % with respect to the total weight of the first coating layer, specifically 40-90 wt %, and more specifically 50-90 wt %. When the inorganic oxide is contained within the above range, the inorganic oxide may be prevented from being separated from the first coating layer and the durability of the separation membrane may be improved.

The second coating layer includes a second organic binder, and may selectively further include an inorganic oxide.

The second organic binder improves processability, and is used for fixing an inorganic oxide when the second coating layer selectively further includes an inorganic oxide. Specifically, the second organic binder may use conventional organic binders well known in the art such as poly(vinylidene fluoride) (PVdF) and PVdF-co-HFP (copolymer of poly(vinylidene fluoride) and hexafluoropropylene). On the other hand, the second organic binder may be included in an amount of 100 wt % with respect to the total weight of the second coating layer to form a coating layer alone, and when an inorganic oxide is further contained, the second organic binder may be included in an amount of 10-80 wt % with respect to the total weight of the second coating layer, specifically 10-70 wt %, and more specifically 10-60 wt %.

The inorganic oxide is a compound having excellent heat resistance and durability, and when coated on the separation membrane, the mechanical strength of the separation membrane may be improved and the heat resistance may also be improved.

Specifically, for example, the inorganic oxide may contain at least one element selected from the group consisting of Si, Al, Ti, Zr, Sn, Ce, Mg, Ca, Zn, Y, Pb, Ba, Hf, and Sr, and preferably at least one element selected from the group consisting of Si, Al, Ti, and Zr.

More specifically, the inorganic oxide is $SiO_2$, $Al_2O_3$, $TiO_2$, $ZrO_2$, $SnO_2$, $CeO_2$, MgO, CaO, ZnO, $Y_2O_3$, $Pb(Zr,Ti)O_3$ (PZT), $Pb_{(1-a1)}La_{a1}Zr_{(1-b1)}Ti_{b1}O_3$ (PLZT, $0 \leq a1 \leq 1$ and $0 \leq b1 \leq 1$), $Pb(Mg_{1/3}Nb_{2/3})O_3$—$PbTiO_3$ (PMN-PT), $BaTiO_3$, $HfO_2$ (hafnia), $SrTiO_3$, etc., and the described inorganic oxides have generally characteristics such that physical properties do not change even when temperature thereof is higher than 200° C. More preferably, the inorganic oxide may include at least one selected from the group consisting of $SiO_2$, $Al_2O_3$, $TiO_2$, and $ZrO_2$.

The inorganic oxide may be included in an amount of 20-90 wt % with respect to the total weight of the second coating layer, specifically 40-90 wt %, and more specifically 50-90 wt %. When the inorganic oxide is contained within the above range, the inorganic oxide may be prevented from being separated from the second coating layer and the durability of the separation membrane may be improved.

Meanwhile, the separation membrane for a lithium secondary battery according to the present invention may have a structure in which (1) a first coating layer is formed on a substrate and a second coating layer is formed on the first coating layer, or (2) a second coating layer is formed on a substrate and a first coating layer is formed on the second coating layer.

At this time, when a first coating layer is formed first on a substrate as in the structure (1), a second coating layer which includes an inorganic oxide having excellent durability and heat resistance is formed on the first coating layer, and accordingly, a lamination-stack process or a lamination-folding process using an electrode assembly including the separation membrane formed in this manner may be easily performed. Specifically, the lamination-stack lithium secondary battery may be manufactured by a lamination process in which one or more separation membranes are first bonded to one or more positive electrodes or negative electrodes to form a unit cell including positive electrode/separation membrane/negative electrode, and thereafter, disposing a separation membrane between the unit cells and stacking/welding the same to form an electrode assembly, and then, inserting the electrode assembly into a battery case and injecting an electrolyte. On the other hand, the lamination-folding lithium secondary battery may be manufactured by folding the unit cells produced through the lamination process using a long separation membrane sheet to form an electrode assembly, and then, inserting the electrode assembly into a battery case and injecting an electrolyte. On the other hand, since the second coating layer is formed of the inorganic oxide and second organic binder, and voids exist therein, an oligomer contained in the electrolyte composition may penetrate into a gap between the first coating layer and gel polymer electrolyte to perform polymerization, and accordingly, bonding force between the gel polymer electrolyte and separation membrane is maintained at a certain level or more.

Meanwhile, when a second coating layer is formed first on a substrate as in the structure (2), an inorganic oxide having excellent durability may be first applied to the substrate to improve mechanical properties of the substrate and improve economic efficiency of a process for forming a separation membrane. However, when designing the separation membrane, a structure of the separation membrane is not limited to one structure among the above-described two laminate structures, and a laminate structure may be designed differently depending on the using purpose of a separation membrane for a lithium secondary battery and the process for manufacturing the same. Furthermore, in order to improve the heat resistance and mechanical properties of the separation membrane in addition to the above laminate structure, it is also possible to further laminate a first coating layer and/or a second coating layer, and to further form a coating layer having a multilayer structure.

Meanwhile, the total thickness of the first coating layer and the second coating layer may be 0.2-20 μm. Specifically, the total thickness may be 0.5-17 μm, and more specifically, the total thickness may be 1-15 μm. When the total thickness is within the above range, the mechanical properties of the separation membrane and the bonding force with the gel polymer electrolyte may be improved without deteriorating mobility of lithium ions.

Lithium Secondary Battery

Hereinafter, a lithium secondary battery will be described.

The lithium secondary battery according to the present invention includes: (1) an electrode assembly including at least one unit cell which contains at least one positive electrode, at least one negative electrode, and at least one first separation membrane disposed between the positive electrode and negative electrode; and (2) a gel polymer electrolyte formed by polymerizing an oligomer having an epoxy group, a functional group capable of ring-opening reaction with an epoxy group, or a combination thereof, wherein the first separation membrane is a separation membrane according to the present invention.

At this time, the separation membrane according to the present invention is the same as that described above, and a detailed description thereof will be omitted. Hereinafter, each configuration of the unit cells included in the electrode assembly will be described.

First, at least one positive electrode included in the unit cell may be produced by coating a positive electrode current collector with a positive electrode mixture slurry containing a positive electrode active material, an electrode binder, an electrode conductive material, a solvent, etc.

The positive electrode current collector is not particularly limited as long as having conductivity without causing any chemical changes in the battery, and for example, stainless steel, aluminum, nickel, titanium, sintered carbon, or aluminum or stainless steel of which a surface is surface-treated with carbon, nickel, titanium, silver, etc. may be used.

The positive electrode active material is a compound capable of reversibly intercalating and de-intercalating lithium, and specifically may include a lithium composite metal oxide including lithium and at least one metal such as cobalt, manganese, nickel, or aluminum. More specifically, the lithium composite metal oxide may be lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-y1}Mn_{y1}O_2$ (where $0<Y1<1$), $LiMn_{2-z1}Ni_{z1}O_4$ (where $0<Z1<2$), etc.), lithium-nickel-cobalt-based oxide (e.g., $LiNi_{1-y2}Co_{y2}O_2$ (where $0<Y2<1$), etc.), lithium-manganese-cobalt-based oxide (e.g., $LiCo_{1-y3}Mn_{y3}O_2$ (where $0<Y3<1$), $LiMn_{2-z2}Co_{z2}O_4$ (where $0<Z2<2$), etc.), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$), $Li(Ni_{p2}CO_{q2}Mn_{r2})O_4$ (where $0<p2<2$, $0<q2<2$, $0<r2<2$, and $p2+q2+r2=2$), etc.), or lithium-nickel-cobalt-transition metal (M) oxide (e.g., $Li(Ni_{p3}Co_{q3}Mn_{r3}M_{S1})O_2$ (where M is selected from the group consisting of Al, Fe, V, Cr, Ti, Ta, Mg, and Mo, and p3, q3, r3, and s1 are atomic fractions of each independent elements, $0<p3<1$, $0<q3<1$, $0<r3<1$, $0<S1<1$, and $p3+q3+r3+S1=1$), etc.), and any one thereof or a compound of two or more thereof may be included.

Among these active materials, to improve capacity characteristics and stability of a battery, the lithium composite metal oxide may be $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.) or lithium nickel cobalt aluminum oxide (e.g., $LiNi_{0.8}Co_{0.15}Al_{0.05}O_2$, etc.), and, in consideration of a significant improvement effect according to control of kinds and content ratio of constituting elements forming the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 60-98 wt % with respect to the total weight of a solid content excluding the solvent in the positive electrode active material slurry, preferably 70-98 wt %, and more preferably 80-98 wt %.

The binder is a component which assists in binding between the active material and conductive material, and in binding with the current collector. Specifically, the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, ethylene-propylene-diene terpolymer (EPDM), sulfonated EPDM, styrene-butadiene rubber, fluoro rubber, various copolymers, etc. The binder may be conventionally included in an amount of 1-20 wt % with respect to the total weight of a solid content excluding the solvent in the positive electrode active material slurry, preferably 1-15 wt %, and more preferably 1-10 wt %.

The conductive material is a component for further improving conductivity of a positive electrode active material. The conductive material is not particularly limited as long as having conductivity without causing any chemical changes in the battery, and for example, graphite; a carbon-based material such as carbon black, acetylene black, Ketjen black, channel black, furnace black, lamp black, or thermal black; conductive fibers such as carbon fibers or metal fibers; metal powders such as fluorocarbon powders, aluminum powders, or nickel powders; conductive whisker such as zinc oxide or potassium titanate; a conductive metal oxide such as titanium oxide; or a conductive material such as a polyphenylene derivative, may be used. Specific examples of a commercially available conductive material may be acetylene black-based products (products of Chevron Chemical Company, Denka Singapore Private Limited, or Gulf Oil Company), Ketjen black, ethylene carbonate (EC)-based products (product of Armak Company), Vulcan XC-72 (product of Cabot Company), or Super P (product of Timcal Graphite & Carbon). The conductive material may be included in an amount of 1-20 wt % with respect to the total weight of a solid content excluding the solvent in the positive electrode active material slurry, preferably 1-15 wt %, and more preferably 1-10 wt %.

The solvent may include an organic solvent such as N-methyl-2-pyrrolidone (NMP), and may be used in an amount of having desirable viscosity when the positive electrode active material as well as selectively the positive electrode binder and positive electrode conductive material are included. For example, the solvent may be included in an amount such that a concentration of the solid content in the slurry which includes the positive electrode active material as well as selectively the positive electrode binder and positive electrode conductive material is 60-95 wt %, preferably 70-95 wt %, and more preferably 70-90 wt %.

Furthermore, the negative electrode, for example, may be produced by coating a negative electrode current collector with a negative electrode mixture slurry containing a negative electrode active material, a negative electrode binder, a negative electrode conductive material, a solvent, etc. On the other hand, the negative electrode may use the metal current collector itself as an electrode.

The negative electrode current collector generally has a thickness of 3-500 μm. Such a negative electrode current collector is not particularly limited as long as having conductivity without causing any chemical changes in the battery, and for example, copper, stainless steel, aluminum, nickel, titanium, sintered carbon, aluminum or stainless steel of which a surface is surface-treated with carbon, nickel, titanium, silver, etc., or an aluminum-cadmium alloy may be used. In addition, similar to the positive electrode current collector, fine unevenness may be formed on the surface thereof to enhance the bonding force of the negative electrode active material, and various forms such as film, sheet, foil, net, porous body, foam, and nonwoven fabric may be used.

The negative electrode active material may be at least one negative electrode active material selected from the group consisting of natural graphite, artificial graphite, a carbonaceous material; lithium-containing titanium composite oxide (LTO); metals (Me) such as Si, Sn, Li, Zn, Mg, Cd, Ce, Ni, or Fe; alloys formed of the metals (Me); oxides ($MeO_x$) of the metals (Me); and composites of the metals (Me) and carbon.

The negative electrode active material may be included in an amount of 60-98 wt % with respect to the total weight of a solid content excluding the solvent in the negative electrode active material slurry, preferably 70-98 wt %, and more preferably 80-98 wt %.

The description of the electrode binder, electrode conductive material, and solvent are the same as those described above, and the detailed description thereof will be omitted.

The gel polymer electrolyte may be disposed between the positive electrode, the negative electrode, and the separation membrane, and the gel polymer electrolyte is formed by polymerizing an oligomer, and includes an epoxy group, a functional group capable of ring-opening reaction with an epoxy group, or a combination thereof. When the oligomer is used, thermally polymerization occurs through a ring-opening reaction between oligomers, and the oligomer may also be bonded to the first organic binder contained in the first coating layer through an epoxy ring-opening reaction.

More specifically, the oligomer includes an epoxy group, a functional group capable of ring-opening reaction with an epoxy group, or a combination thereof. When the oligomer is used, thermally polymerization occurs through a ring-opening reaction between oligomers, and the oligomer may also be bonded to the first organic binder contained in the first coating layer through an epoxy ring-opening reaction.

Meanwhile, in the case of an oligomer which undergoes a polymerization reaction through the conventional radical polymerization reaction, only when a polymerization initiator is essentially used, the oligomer may be bonded through a polymerization reaction. However, azo-based and peroxide-based compounds used as radical polymerization initiators may have a problem in that the safety of a battery is deteriorated by generating a gas inside a battery during a curing reaction.

Meanwhile, the oligomer used in the gel polymer electrolyte of the present invention is an oligomer polymerized through an epoxy ring-opening reaction, and a polymerization reaction may be performed without using a polymerization initiator used for polymerizing the conventional oligomer. Accordingly, since the gas is not generated in a battery even during curing through a polymerization reaction, swelling of a battery and short-circuiting of an electrode caused by the swelling may be prevented in advance, thereby improving the safety of a battery.

Specifically, the oligomer may include at least one unit selected from the group consisting of a unit containing an alkylene oxide group and a unit containing an amine group, wherein an epoxy group, a functional group capable of ring-opening reaction with an epoxy group, or a combination thereof may be substituted in a main chain which is formed of the unit.

The oligomer may include, for example, at least one compound selected from the group consisting of compounds represented by Formulae 1 and 2 below:

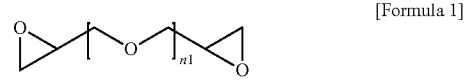

[Formula 1]

n1 may be an integer of 2 to 10,000, preferably 2 to 7,500, and more preferably 2 to 5,000; and

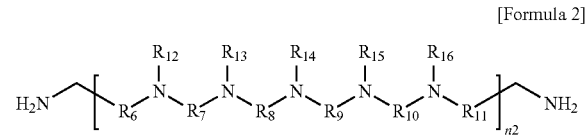

[Formula 2]

In Formula 2, $R_6$ to $R_{11}$ are a substituted or unsubstituted alkylene group having 1 to 5 carbon atoms, and $R_{12}$ to $R_{16}$ are each independently at least one selected from the group consisting of hydrogen (H), a substituted or unsubstituted alkyl group having 1 to 10 carbon atoms, —$NR_{17}R_{18}$, and —$R_{19}NR_{20}R_{21}$, wherein $R_{19}$ is a substituted or unsubstituted alkylene group having 1 to 5 carbon atoms, and $R_{17}$, $R_{18}$, $R_{20}$, and $R_{21}$ are each independently hydrogen (H), a substituted or unsubstituted alkyl group having 1 to 5 carbon atoms, and —$R_{22}NH_2$, wherein $R_{22}$ is a substituted or unsubstituted alkylene group having 1 to 5 carbon atoms, and n2 is an integer of 1 to 10,000, preferably 1 to 7,500, and more preferably 1 to 5,000.

Meanwhile, when the oligomer contains both the compounds represented by Formulae 1 and 2, the compound represented by Formula 1 and the compound represented by Formula 2 may be mixed at a weight ratio of 30:70 to 100:0, preferably 40:60 to 95:5. When the oligomer which contains the compounds mixed at the described weight ratio, mechanical properties of polymers formed of the oligomer may be improved, thereby preventing leakage of the gel polymer electrolyte and improving adhesion to the separation membrane.

More specifically, the compound represented by Formula 2 may include at least one compound selected from the group consisting of compounds represented by Formulae 2-1 to 2-3 below:

[Formula 2-1]

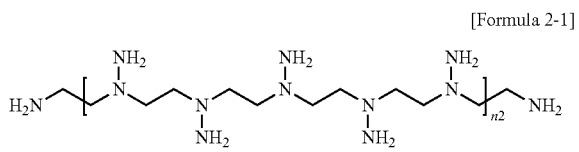

In Formula 2-1, n2 is an integer of 1 to 10,000;

[Formula 2-2]

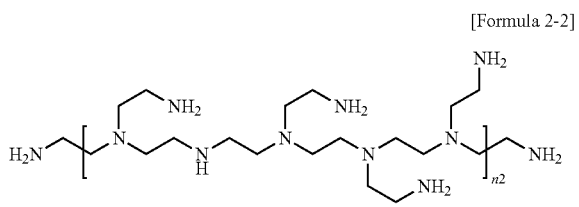

In Formula 2-2, n2 is an integer of 1 to 10,000; and

[Formula 2-3]

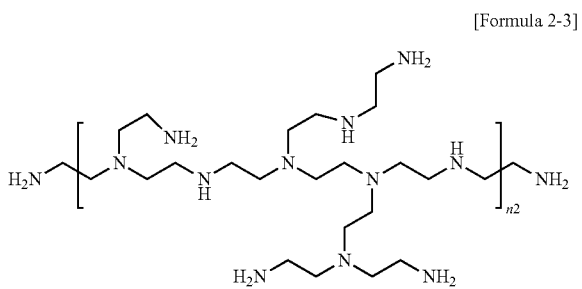

In Formula 2-3, n2 is an integer of 1 to 10,000.

n2 may preferably be an integer of 1 to 10,000, and more preferably an integer of 1 to 7,500.

The oligomer represented by Formula 1 or Formula 2 may have a weight average molecular weight (Mw) of about 100-1,000,000, preferably 100-900,000, and more preferably 300-800,000. When the oligomer has a weight average molecular weight within the above range, the gel polymer electrolyte formed by curing may be stably formed to improve the mechanical properties in a battery, thereby suppressing generation of heat and ignition which may be caused by external impact of a battery, and also controlling an explosion phenomenon which may be caused by the generation of heat and ignition. In addition, leakage and volatilization of the electrolyte may be suppressed, thereby significantly improving high-temperature safety of a lithium secondary battery.

Meanwhile, the gel polymer electrolyte is preferably formed by injecting a gel polymer electrolyte composition containing the oligomer into a battery case and curing the composition.

More specifically, the secondary battery according to the present invention may be manufactured through steps in which: (a) injecting an electrode assembly into a battery case, the electrode assembly including at least one unit cell which contains at least one positive electrode, at least one negative electrode, and at least one first separation membrane disposed between the positive electrode and negative electrode; and (b) injecting the gel polymer electrolyte composition according to the present invention into the battery case and polymerizing the composition to form a gel polymer electrolyte.

At this time, the gel polymer electrolyte composition may include, in addition to the oligomer, a lithium salt and a non-aqueous organic solvent.

Any lithium salt conventionally used in an electrolyte for a lithium secondary battery may be used as the lithium salt without limitation. For example, the lithium salt may include $Li^+$ as a cation, and may include, as an anion, at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$. One or, as necessary, a mixture of two or more thereof may be used as the lithium salt. The lithium salt may be contained at a concentration of 0.8-2 M, specifically 0.8-1.5 M in the gel polymer electrolyte composition. However, the concentration is not necessarily limited to the concentration range, and the lithium salt may also be contained at a high concentration of 2M or more depending on the other components in the gel polymer electrolyte composition.

Any non-aqueous organic solvent conventionally used in an electrolyte for a lithium secondary battery may be used as the non-aqueous organic solvent without limitation. For example, an ether compound, an ester compound, an amide compound, a linear carbonate compound, or a cyclic carbonate compound may be used alone or in a mixture of two or more thereof. Among them, a cyclic carbonate compound, a linear carbonate compound, or a mixture thereof may be typically used.

Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. In addition, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the embodiment is not limited thereto.

Particularly, among the carbonate-based organic solvents, cyclic carbonate, such as ethylene carbonate or propylene carbonate, which is known to well dissociate a lithium salt in an electrolyte due to high dielectric constant as an organic solvent having a high viscosity, may be used, and in addition to such cyclic carbonate, when linear carbonate, such as dimethyl carbonate or diethyl carbonate, which has low viscosity and low dielectric constant, is mixed and used at an appropriate ratio, an electrolyte having a high electric conductivity may be prepared.

In addition, among the non-aqueous organic solvents, the ether compound may use any one selected from the group consisting of dimethyl ether, diethyl ether, dipropyl ether, methylethyl ether, methylpropyl ether, and ethylpropyl ether, or a mixture of two or more thereof, but the embodiment is not limited thereto.

Furthermore, among the non-aqueous organic solvents, the ester compound may use any one selected from the group consisting of linear ester such as methyl acetate, ethyl acetate, propyl acetate, methyl propionate, ethyl propionate, propyl propionate, or butyl propionate; and cyclic ester such as γ-butyrolactone, γ-valerolactone, γ-caprolactone, σ-valerolactone, and ε-caprolactone, or a mixture of two or more thereof, but the embodiment is not limited thereto.

Meanwhile, in another embodiment, the electrode assembly may include two or more unit cells, and may further include a second separation membrane disposed between the unit cells. The unit cell used at this time is the same as that described above, and the second separation membrane may use a generally used separation membrane such as polypropylene or polyethylene which is conventionally known as a polyolefin-based separation membrane, and alternatively, a composite separation membrane having a structure in which inorganic and organic composite layers are formed on an olefin-based substrate may be used, or the separation membrane according to the present invention may be used.

Furthermore, the electrode assembly may be a lamination-folding type or lamination-stack type electrode assembly. A lithium secondary battery may be classified according to structures of positive electrode/separation membrane/negative electrode structure unit cells included in an electrode assembly, and there may typically be, a jelly-roll (wound type) unit cell having a structure in which positive electrodes and negative electrodes having a long sheet-type are wound with separation membranes interposed therebetween, a stack type (lamination type) unit cell having a structure in which a plurality of positive electrodes and negative electrodes taken in units of a predetermined size are sequentially laminated with separation membranes interposed therebetween, a stack-folding type electrode assembly having a structure in which the unit cells are wound with a separation membrane having a mono-cell or bi-cell film-type, etc.

At this time, when the separation membrane according to the present invention is used as a first separation membrane included in a unit cell, a second coating layer included in the first separation membrane contains an inorganic oxide having high heat resistance and mechanical durability, and accordingly, even when applied into a lithium secondary battery which is manufactured through a lamination-folding or lamination-stack method, a problem that a substrate used for the first and second separation membranes is damaged due to high temperature and high pressure conditions during the process to cause short-circuit of a battery may be prevented in advance, thereby improving processability.

Mode for Carrying Out the Invention

Hereinafter, the present invention will be described in more detail, according to specific examples. However, the following examples are merely presented to exemplify the present invention, and the scope of the present invention is not limited thereto. It will be apparent to those skilled in the art that various modifications and alterations are possible within the scope and technical spirit of the present invention, and such modifications and alterations fall within the scope of claims included herein.

EXAMPLES

1. Example 1

(1) Preparation of Substrate 100 g of polyethylene and 20 g of polyvinyl alcohol, as a pore-forming agent, were mixed to form a mixture. The mixture was dissolved in dimethylformamide, as a polar solvent, at a ratio of about 1:10 parts by weight to form a polymer solution. The polymer solution was cast on a glass plate, and then dried in an oven at about 100° C. for about 30 minutes to obtain a polymer film. Thereafter, polyvinyl alcohol (PVA) was extracted by immersing the polymer film in water to prepare a porous substrate.

(2) Preparation of Separation Membrane for Lithium Secondary Battery 3 g of polyvinylidene fluoride (hereinafter, referred to as PVdF, weight average molecular weight: 50,000), as a first organic binder, in which an epoxy group was substituted by 0.5 mol %, and 27 g of aluminum oxide ($Al_2O_3$) as an inorganic oxide were added into 72.1 ml of an N-methyl-2-pyrrolidone (hereinafter, referred to as NMP) solvent, and then mixed to prepare a first coating layer composition. Thereafter, the first coating layer composition was applied onto the porous substrate and then dried to form a first coating layer having a thickness of 5 μm. Thereafter, 3 g of PVdF (weight average molecular weight: 50,000), as a second organic binder, in which an epoxy group was not substituted, and 27 g of aluminum oxide ($Al_2O_3$) as an inorganic oxide were added into 72.1 ml of an NMP solvent, and then mixed to prepare a second coating layer composition, and thereafter the second coating layer composition was applied onto the first coating layer and then dried to form a second coating layer having a thickness of 5 μm.

(3) Manufacture of Lithium Secondary Battery 94 wt % of $Li(Ni_{0.8}Mn_{0.1}Co_{0.1})O_2$ as a positive electrode active material, 3 wt % of carbon black as a conductive material, and 3 wt % of PVdF as a binder were added to an NMP solvent to prepare a positive electrode active material mixture slurry. The positive electrode active material mixture slurry was applied onto an aluminum (Al) thin film, which is a positive electrode current collector having a thickness of about 20 μm, followed by drying and roll pressing to produce a positive electrode.

96 wt % of carbon powders as a negative electrode active material, 3 wt % of PVdF as a binder, and 1 wt % of carbon black as a conductive material were added to an NMP solvent to prepare a negative electrode active material mixture slurry. The negative electrode active material mixture slurry was applied onto a copper (Cu) thin film, which is a negative electrode current collector having a thickness of 10 μm, followed by drying and roll pressing to produce a negative electrode.

5 g of a mixture, in which the compound represented by Formula 1 (weight average molecular weight (Mw): 500) and the compound represented by Formula 2-3 were mixed at a weight ratio of 7:3, was added to 94.99 g of an organic solvent, in which 1 M $LiPF_6$ was dissolved in ethylene carbonate (EC) and ethyl methyl carbonate (EMC) (EC:EMC=3:7 (volume ratio)), followed by stirring and completely dissolving to prepare a gel polymer electrolyte composition.

A unit cell (electrode assembly) in which the positive electrode/separation membrane/negative electrode were sequentially stacked was accommodated in a battery case, and then the gel polymer electrolyte composition was injected thereto and stored at room temperature for 2 days. Thereafter, the case was heated at 60° C. for 24 hours (thermal polymerization process) to manufacture a lithium secondary battery.

2. Example 2

A separation membrane for a lithium secondary battery and a lithium secondary battery were manufactured in the same manner as in Example 1 except that PVdF-co-HFP (copolymer of poly(vinylidene fluoride) and hexafluoropropylene, hereinafter, referred to as PVdF-co-HFP) (weight average molecular weight: 100,000), in which an epoxy group was substituted by 0.5 mol %, instead of PVdF (weight average molecular weight: 50,000), in which an epoxy group was substituted by 0.5 mol %, was used as a first organic binder, and PVdF-co-HFP, in which an epoxy group was not substituted, instead of PVdF, in which an epoxy group was not substituted, was used as a second organic binder, in Example 1.

3. Example 3

A separation membrane for a lithium secondary battery and a lithium secondary battery were manufactured in the same manner as in Example 1 except that the second coating layer composition was applied first on a substrate, and then dried to form a second coating layer, and thereafter the first coating layer composition was applied, and then dried to form a first coating layer, in Example 1.

4. Example 4

A separation membrane for a lithium secondary battery and a lithium secondary battery were manufactured in the same manner as in Example 2 except that the second coating layer composition was applied first on a substrate, and then dried to form a second coating layer, and thereafter the first coating layer composition was applied, and then dried to form a first coating layer, in Example 2.

Comparative Examples

1. Comparative Example 1

A separation membrane for a lithium secondary battery and a lithium secondary battery were manufactured in the same manner except that a substrate on which both the first and second coating layers were not formed, was used as a separation membrane, in Example 1.

2. Comparative Example 2

A separation membrane for a lithium secondary battery and a lithium secondary battery were manufactured in the same manner except that a second coating layer was formed directly on a substrate without forming a first coating layer, in Example 1.

Experimental Examples

1. Experimental Example 1: Test of Initial Resistance Measurement

Formation was performed on each of the lithium secondary batteries manufactured in Examples 1 to 4 and Comparative Examples 1 and 2 at a current of 200 mA (0.1 C rate), and then CC/CV charging at 4.2 V and 666 mA (0.33 C, 0.05 C cut-off) and CC discharging at 3 V and 666 mA (0.33 C) were repeated 3 times, and thereafter a voltage drop generated when 10 second discharging was performed at current of 5 A (2.5 C) was measured, and a DC-resistance value calculated by substituting the measured value into formula of R=V/I (Ohm's law) is shown in Table 1 below as an initial resistance value.

TABLE 1

|  | Initial resistance (Ohm) |
| --- | --- |
| Example 1 | 0.041 |
| Example 2 | 0.043 |
| Example 3 | 0.041 |
| Example 4 | 0.042 |
| Comparative Example 1 | 0.070 |
| Comparative Example 2 | 0.065 |

Referring to Table 1, it may be confirmed that the lithium secondary batteries in Examples 1 to 4 have lower initial resistance as compared with the lithium secondary batteries in Comparative Examples 1 and 2 because the adhesion between the gel polymer electrolyte and separation membrane is high, thereby improving the interfacial characteristics.

2. Experimental Example 2: Test of High Temperature Cycle (Life-Time) Measurement of Battery Formation was performed on each of the lithium secondary batteries manufactured in Examples 1 to 4 and Comparative Examples 1 and 2 at a current of 200 mA (0.1 C rate), and then CC/CV charging at 4.2 V and 666 mA (0.33 C, 0.05 C cut-off) and CC discharging at 3 V and 666 mA (0.33 C) were repeated 50 times at high temperature of 45° C.

Thereafter, a capacity retention rate was calculated using the 50th discharge capacity and the first initial capacity (discharge capacity in a state that the first charging and discharging were performed), and the results are shown in Table 2.

TABLE 2

|  | Capacity retention rate after 50 cycles (%) |
| --- | --- |
| Example 1 | 93 |
| Example 2 | 94 |
| Example 3 | 91 |
| Example 4 | 93 |
| Comparative Example 1 | 78 |
| Comparative Example 2 | 82 |

Referring to Table 2, it may be confirmed that the lithium secondary batteries in Examples 1 to 4 have the improved cycle characteristics at high temperature because the gel polymer electrolyte is stably formed, and also has the excellent adhesion to the separation membrane, and the distribution of the gel polymer electrolyte is improved, thereby suppressing the additional degradation reaction of the gel polymer electrolyte.

3. Experimental Example 3: High Temperature Safety Evaluation (HOT Box Test)

Each of the lithium secondary batteries manufactured in Examples 1 to 4 and Comparative Examples 1 and 2 waw fully charged at a state of charge (SOC) of 100%, and then the lithium secondary battery was left standing for 4 hours at 150° C. to perform tests of confirming whether or not ignition occurred and confirming the time at which the ignition started. The results are shown in Table 3 below.

TABLE 3

|  | Whether or not ignition occurred | Ignition start time (minutes) |
|---|---|---|
| Example 1 | x | — |
| Example 2 | x | — |
| Example 3 | x | — |
| Example 4 | x | — |
| Comparative Example 1 | o | <5 |
| Comparative Example 2 | o | 30 |

In Table 3, x represents a case in which ignition did not occur during storage at 150° C., and O represents a case in which the ignition occurred during storage at 150° C.

Referring to Table 3, it may be confirmed that since the lithium secondary batteries in Examples 1 to 4 have excellent interfacial stability between the electrolyte and separation membrane even when stored at high temperature in a fully charged state, exothermic reaction and thermal runaway phenomenon are suppressed, and ignition do not occur. In contrast, it may be confirmed that since the lithium secondary batteries in Comparative Examples 1 and 2 have low interfacial stability between the electrolyte and separation membrane, an exothermic reaction is not suppressed during storage at 150° C., and thermal runaway phenomenon and ignition occur in series.

The invention claimed is:

1. A separation membrane for a lithium secondary battery, the separation membrane comprising:
   a substrate;
   a first coating layer containing a first organic binder which is able to be bonded to a gel polymer electrolyte through an epoxy ring-opening reaction; and
   a second coating layer containing a second organic binder,
   wherein the first organic binder is substituted with epoxy group, a functional group capable of ring-opening reaction with an epoxy group, or a combination thereof, and
   the gel polymer electrolyte is formed by polymerizing an oligomer having an epoxy group, a functional group capable of ring-opening reaction with an epoxy group, or a combination thereof.

2. The separation membrane of claim 1,
   wherein the functional group capable of ring-opening reaction with an epoxy group is at least one functional group selected from the group consisting of a hydroxyl group (OH), a carboxylic acid group (COOH), an amine group, an isocyanate group, a mercaptan group, and an imide group.

3. The separation membrane of claim 1,
   wherein the first organic binder comprises a unit containing at least one selected from the group consisting of an alkylene group which is substituted with at least one halogen element and which has 1 to 5 carbon atoms, an alkylene oxide group having 1 to 5 carbon atoms, an alkylene oxide group which is substituted with at least one halogen and which has 1 to 5 carbon atoms, an imide group, and cellulose, and
   an epoxy group, a functional group capable of ring-opening reaction with an epoxy group, or a combination thereof is substituted in a main chain which is formed of the unit.

4. The separation membrane of claim 1,
   wherein the oligomer comprises at least one unit selected from the group consisting of a unit containing an alkylene oxide group and a unit containing an amine group, and
   an epoxy group, a functional group capable of ring-opening reaction with an epoxy group, or a combination thereof is substituted in a main chain which is formed of the unit.

5. The separation membrane of claim 1,
   wherein at least one coating layer, which is selected from the first coating layer and the second coating layer, comprises an inorganic oxide containing at least one element selected from the group consisting of Si, Al, Ti, Zr, Sn, Ce, Mg, Ca, Zn, Y, Pb, Ba, Hf, and Sr.

6. The separation membrane of claim 1,
   wherein the first coating layer is formed on the substrate, and
   the second coating layer is formed on the first coating layer.

7. The separation membrane of claim 1,
   wherein the second coating layer is formed on the substrate, and
   the first coating layer is formed on the second coating layer.

8. The separation membrane of claim 1,
   wherein the total thickness of the first coating layer and the second coating layer is 0.2-20 μm.

9. A lithium secondary battery comprising:
   an electrode assembly including at least one unit cell which contains at least one positive electrode, at least one negative electrode, and at least one first separation membrane disposed between the positive electrode and negative electrode; and
   a gel polymer electrolyte formed by polymerizing an oligomer having an epoxy group, a functional group capable of ring-opening reaction with an epoxy group, or a combination thereof,
   wherein the first separation membrane is a separation membrane for a lithium secondary battery of claim 1.

10. The lithium secondary battery of claim 9,
    wherein the electrode assembly comprises two or more unit cells, and further comprises a second separation membrane disposed between the unit cells.

* * * * *